(12) United States Patent
Li et al.

(10) Patent No.: US 9,989,383 B2
(45) Date of Patent: Jun. 5, 2018

(54) MONITORING SOLENOID PLUNGER POSITION

(71) Applicant: Goodrich Actuation Systems Limited, Solihull, West Midlands (GB)

(72) Inventors: Jiang Li, Birmingham (GB); Maamar Benarous, Balsall Common (GB)

(73) Assignee: GOODRICH ACTUATION SYSTEMS LIMITED, Solihull, West Midlands (GB)

( * ) Notice: Subject to any disclaimer, the term of this patent is extended or adjusted under 35 U.S.C. 154(b) by 0 days. days.

(21) Appl. No.: 15/217,138

(22) Filed: Jul. 22, 2016

(65) Prior Publication Data

US 2017/0030739 A1     Feb. 2, 2017

(30) Foreign Application Priority Data

Jul. 31, 2015   (EP) .................................... 15179294

(51) Int. Cl.
G01D 5/20      (2006.01)
H01F 7/18      (2006.01)

(52) U.S. Cl.
CPC ............. G01D 5/20 (2013.01); H01F 7/1844 (2013.01); *H01F 2007/185* (2013.01)

(58) Field of Classification Search
CPC .... G01D 5/20; H01F 7/1844; H01F 2007/185
USPC .................................................. 324/207.15
See application file for complete search history.

(56) References Cited

U.S. PATENT DOCUMENTS

| 5,293,551 | A | 3/1994 | Perkins et al. |
| 7,986,501 | B2 * | 7/2011 | Kamor ................... H01H 83/04 361/42 |
| 8,018,709 | B2 * | 9/2011 | Barabas-Lammert ............. H01F 7/1844 361/160 |
| 2009/0222140 | A1 | 9/2009 | Christiansen |
| 2012/0099239 | A1 | 4/2012 | Sagues et al. |
| 2014/0062466 | A1 * | 3/2014 | Thibault .................. G01B 7/14 324/207.22 |

FOREIGN PATENT DOCUMENTS

| DE | 102005041873 A1 | 3/2007 |
| DE | 102008040250 A1 | 1/2010 |
| DE | 102010032443 A1 | 7/2011 |
| DE | 102013201776 A1 | 8/2014 |
| WO | 9730462 A1 | 8/1997 |

OTHER PUBLICATIONS

Sebastian, Stark; Translation of Method for determining operability of electromagnetically working mechanical lock in motor car, involves obtaining waveforms concerning current value and determining defect of locking device and position of check body using waveforms; Jul. 7, 2017; EPO and Google.*
European Search Report for Application No. 15179294.2-1556 dated Feb. 5, 2016; 8 Pages.

* cited by examiner

*Primary Examiner* — Melissa Koval
*Assistant Examiner* — Rahul Maini
(74) *Attorney, Agent, or Firm* — Cantor Colburn LLP

(57) ABSTRACT

A device for monitoring a solenoid plunger position, comprising means for storing one or more inductance values for the solenoid indicative of desired positions of the solenoid plunger; means for measuring an actual inductance value of the solenoid; means for comparing the actual inductance value and the stored inductance values and for providing an indication of the actual position of the solenoid plunger based on the comparison.

4 Claims, 5 Drawing Sheets

MONITORING SOLENOID PLUNGER POSITION

FOREIGN PRIORITY

This application claims priority to European Patent Application No. 15179294.2 filed Jul. 31, 2015, the entire contents of which is incorporated herein by reference.

TECHNICAL FIELD

The present invention is concerned with monitoring a solenoid and in particular, but not exclusively, for monitoring the position of a solenoid armature or plunger for use in, e.g., solenoid locks or brakes.

BACKGROUND

Linear solenoid locks and brakes have many applications. As an example, such locks and brakes find application in aircraft where safety is critical and where it is necessary to lock/maintain components such as flaps, doors, brakes etc. in position.

FIG. 1 is a schematic view of a solenoid lock comprising an armature or plunger, held under a spring force and linearly moveably arranged within a solenoid coil. When the coil is de-energized, the spring bias will keep the plunger in a first state. When the coil is energized, the resulting magnetic force will overcome the spring force and move the plunger to a second state or linear position. Depending on the application the first state can be a locked state and the second state an unlocked state or vice versa.

Voltage and temperature variations, for example, can affect the position of the plunger using the power on/power off control. To address this, and improve reliability and, hence, safety, a two-level closed-loop control has been used. Here, as seen in FIG. 2, to move the plunger to the second state (can be open or locked depending on application) a first, high level of current (pull-in current) is applied to the solenoid for a predefined period of time (usually longer than its response time in moving to the second state), after which a lower level of current (holding current) is applied to maintain the position. This reduces power losses and temperature rises compared to constantly applying the higher pull-in current.

Although the time period during which the higher pull-in current is supplied is selected to be more than long enough, in normal circumstances, to linearly move the plunger to its end position for the second state, situations can arise that prevent the plunger reaching the end position before the pull-in current is stopped. Mechanical or electrical abnormalities or disturbances can cause the response time to be longer than expected, or mechanical jams can occur. This gives rise to safety issues, e.g. trying to move components while a brake/lock is still locked or the component not being fully locked or arrested.

To overcome these problems, systems have been developed that provide position feedback, rather than relying on an expected response time period. Such systems use a sensor such as a proximity sensor to detect the position of the plunger relative to its end position and to feed this back to the system controller. Such sensors, however, considerably add to the complexity, cost, weight, size and wiring of the system, and more so where dissimilarity (i.e. the use of different types of sensors to prevent common mode failure) or redundancy is required (i.e. two or more sensors) for safety-critical applications.

The present invention aims to provide improved monitoring of a plunger position of a solenoid.

SUMMARY

According to a first aspect, the invention provides a device for monitoring a solenoid plunger position, comprising: means for storing one or more inductance values for the solenoid indicative of desired positions of the solenoid plunger; means for measuring an actual inductance value of the solenoid; means for comparing the actual inductance value and the stored inductance values and for providing an indication of the actual position of the solenoid plunger based on the comparison.

In another aspect, there is provided a method of monitoring a solenoid plunger position comprising: storing one or more inductance values for the solenoid indicative of desired positions of the solenoid plunger; measuring an actual inductance value of the solenoid; comparing the actual inductance value and the stored inductance values; and providing an indication of the actual position of the solenoid plunger based on the comparison.

In a preferred embodiment, the device is incorporated in a solenoid lock comprising a solenoid coil within which a solenoid plunger is linearly movable between a first end position and a second end position and the indication is an indication of the actual position relative to one or both of the first and second end positions.

In a preferred embodiment, the storing means stores predetermined inductance values indicative of the plunger being at the first and the second end positions.

In a preferred embodiment, the indication of the actual position is fed back to a controller. In response, the controller may provide drive current to linearly move the plunger closer to a desired position.

BRIEF DESCRIPTION OF THE DRAWINGS

Preferred embodiments will now be described, by way of example, only, with reference to the drawings.

DETAILED DESCRIPTION

Figure 1:
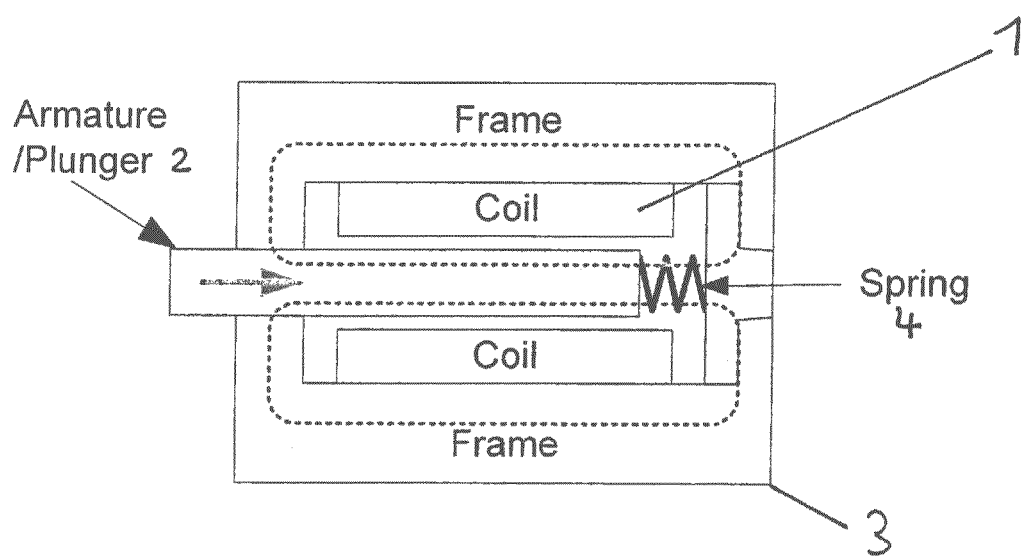
FIG. 1 is a schematic view of a solenoid lock.
Figure 2:
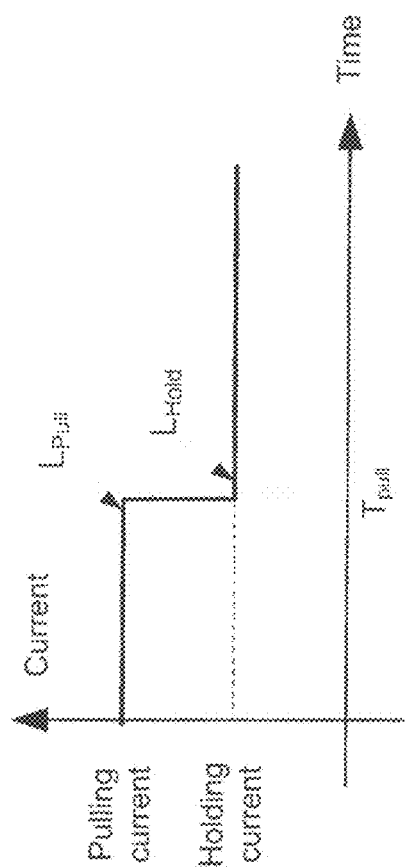
FIG. 2 shows how current is applied over time in a prior art two-level closed-loop control method.

Referring first to FIGS. 1 and 2, as described above, a solenoid lock may comprise a solenoid coil 1 within which is linearly moveably mounted a solenoid armature or plunger 2 held to a frame 3 by a spring 4.

When power is provided to the coil 1 a magnetic force is generated inside the coil and acts on the armature 2 to overcome the force of the spring 4 and to move the armature to one end position relative to the frame (in this case in the direction of the arrow, but it could be the opposite direction). When the coil is de-energized the spring force moves the armature out of the first end position, towards a second end position.

FIG. 2 shows the conventional two-level closed-loop control method often used to compensate for e.g. voltage or temperature variations. As mentioned above, a high level of current Ipull (pull-in current) will be applied to the solenoid for a predefined period Tpull (usually longer than its response time) followed by a low level of current IHold (holding current) to maintain its position and reduce the power losses, hence temperature rise, for the remaining of the operation cycle.

However, as there is no position feedback to the controller, there is no guarantee the plunge will move into its target position at the end of pulling period under e.g. the following conditions:

Any mechanical or electrical abnormalities make solenoid response time longer

Mechanical jam

This might cause safety concerns such as trying to move the system while the brake/lock is still on, or system is not arrested at end of the operation.

To solve this problem, a proximity sensor is usually added to feedback the position information to the system controller.

These will have a big impact on wiring, system complexity hence cost, weight and reliability penalties.

Figure 3:
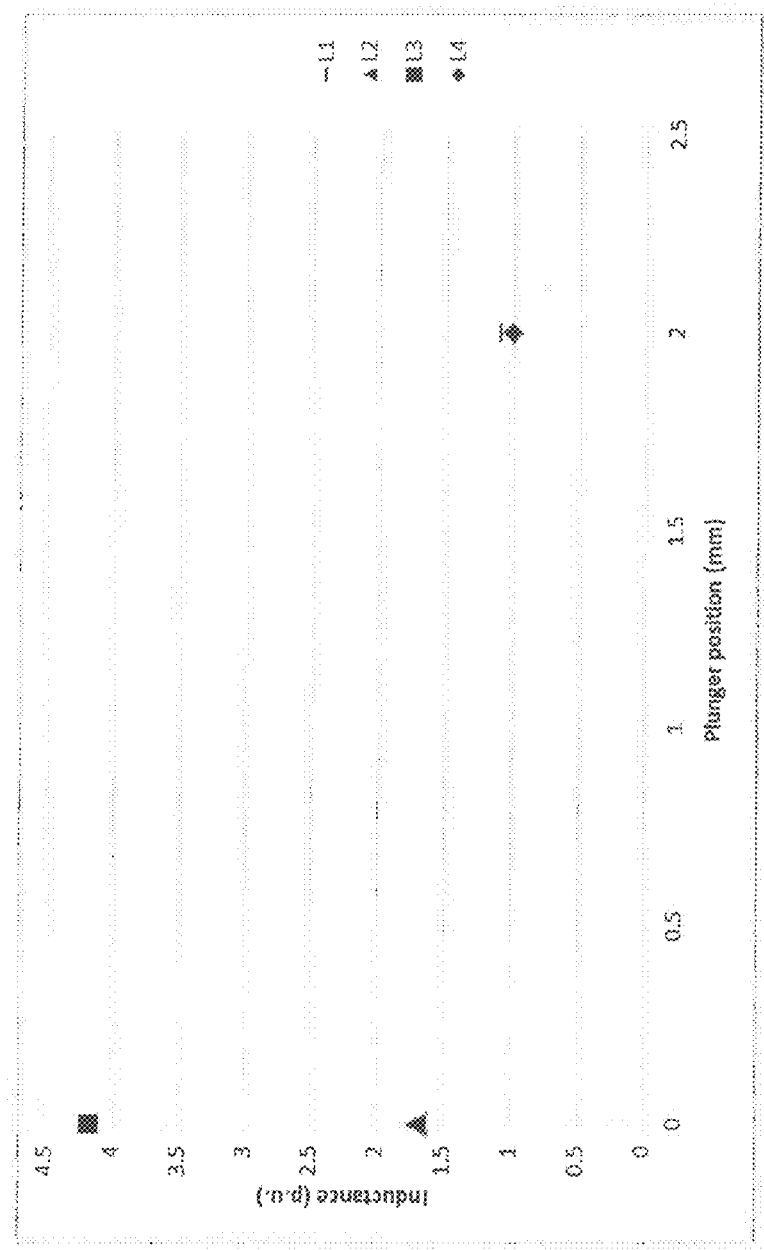
FIG. 3 shows how inductance values vary with the linear position of the solenoid.

FIG. 3 shows inductance measurements used in the present invention.

For a chosen solenoid design (fixed geometry and coil), its inductance is mainly affected by its air gap and flux saturation level (current). As can be seen from the FIG. 3, there are big variations in the inductance at its NEAR/FAR positions (first and second end positions) with different current levels.

Where: L1—Solenoid inductance value with air gap at FAR position and Pulling current;

L2: Solenoid inductance value with air gap at NEAR position and Pulling current;

L3: Solenoid inductance value with air gap at NEAR position and Holding current;

L4: Solenoid inductance value with air gap at FAR position and Holding current.

The present invention allows monitoring and control of the solenoid based on inductance values.

In the closed loop current control system, solenoid applied voltage (duty cycle) and its current are all known values. Solenoid inductance can be derived from those values.

Figure 4:
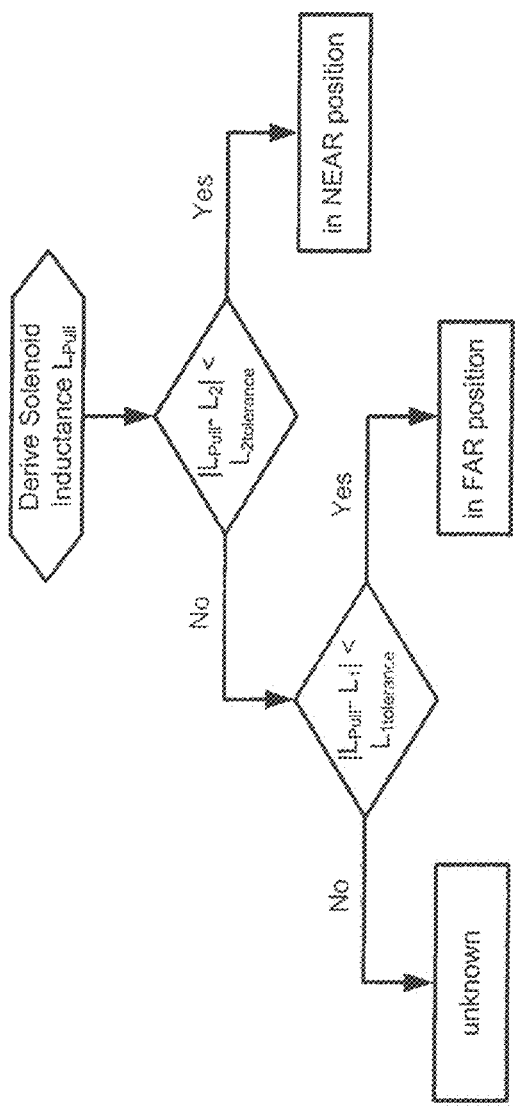
FIG. 4 is a flow chart showing the steps according to an embodiment of the invention.

As seen from FIG. 4, this invention uses the derived solenoid inductance information (LPull), step 100, which is preferably taken just before the end of the pulling period as shown in FIG. 2 and compares it, step 101a, 101b, with the pre-stored inductance values (L1 L2 L3 and L4) in FIG. 3 to confirm whether the plunger is in its target end position or not at end of pulling period.

Figure 5:
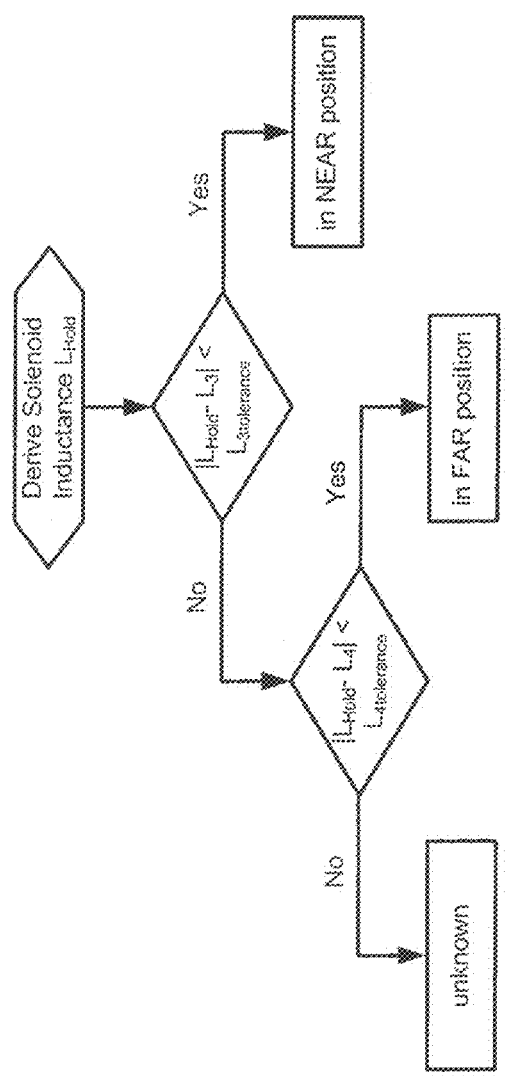
FIG. 5 is a flow chart showing additional preferred steps according to a preferred embodiment.

In a preferred embodiment, with reference to FIG. 5, the solenoid plunger position can also be re-confirmed when the current is in its holding level.

If the actual impedance value does not match a desired value indicative of the desired or target end point, it is determined, e.g. in a controller or processor that receives the comparison results, that a fault or abnormal situation exists and appropriate action may be taken. This may include, for example, informing an operator, issuing an alert or alarm, preventing operation dependent on the solenoid position and/or increasing/decreasing the applied current.

The comparison may be repeated while, for example, the increased current or other remedial measure is applied to determine if and when the solenoid reaches the desired end position.

The present invention thus provides reliable feedback as to the position of the solenoid armature and, if used instead of a position sensor such as a proximity sensor results in a simpler, smaller, lighter, less expensive device even if redundancy is built-in to the device. The principles of the invention can be used instead of or as well as a proximity sensor.

The invention claimed is:

1. A solenoid lock or brake comprising:
a solenoid coil within which a solenoid plunger is linearly movable between a first end position and a second end position;
device for monitoring a solenoid plunger position, comprising:
means for storing one or more inductance values for the solenoid coil indicative of desired positions of the solenoid plunger, the storage means storing predetermined inductance values indicative of the solenoid plunger being at each of the first and second end positions with a pulling current applied to the solenoid coil and predetermined inductance values indicative of the solenoid plunger being at each of the first and second end positions with a holding current applied to the solenoid coil;
means for measuring an actual inductance value of the solenoid coil; and
means for comparing the actual inductance value and the one or more stored inductance values and for providing an indication of an actual position of the solenoid plunger relative to one or both of the first and second end positions based on the comparison;
wherein the indication of the actual position is fed back to a controller;
wherein the controller, in response to the fed back indication, provides drive current to the solenoid coil to linearly move the solenoid plunger closer to the desired position.

2. The device as claimed in claim 1 further comprising a sensor for sensing the actual position of the solenoid plunger based on a measurement other than inductance.

3. The device of claim 2, wherein the sensor is a proximity sensor.

4. A method of monitoring a solenoid plunger position comprising:
storing one or more inductance values indicative of a solenoid plunger being at each of first and second end position with a pulling current applied to a solenoid coil and predetermined inductance values indicative of the solenoid plunger being at each of the first and second end positions with a holding current applied to the solenoid coil;
measuring an actual inductance value of the solenoid coil;
comparing the actual inductance value and the stored inductance values;
providing an indication of the actual position of the solenoid plunger relative to one or both end positions based on the comparison;
feeding the indication back to a controller; and
providing drive current, in response to indication fed back to the controller, to linearly move the solenoid plunger closer to a desired position.

* * * * *